March 18, 1958 W. PUVOGEL 2,826,924
VARIABLE GEAR WITH AUTOMATIC REGULATION
Filed Jan. 2, 1952 2 Sheets-Sheet 1
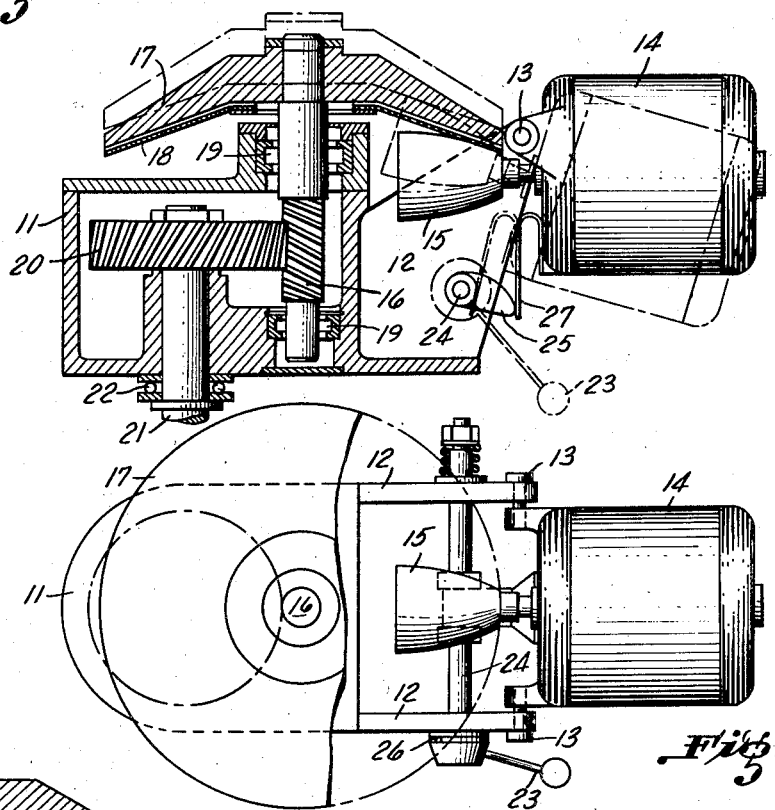
Fig.1
Fig.2
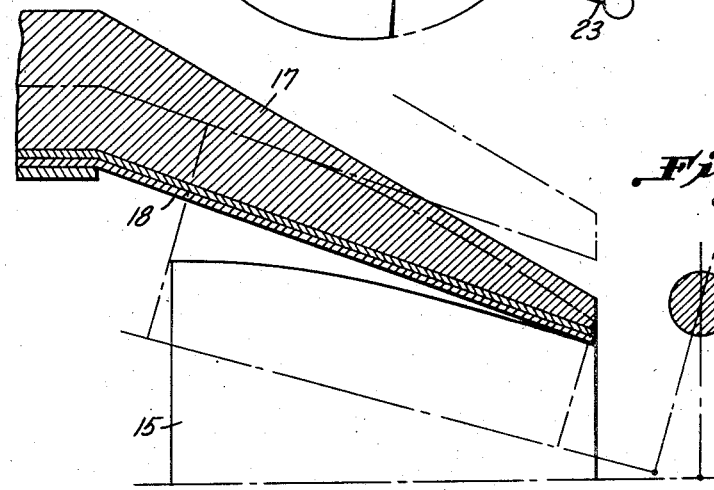
Fig.3
INVENTOR
Willy Puvogel
BY
ATTORNEY March 18, 1958 W. PUVOGEL 2,826,924
VARIABLE GEAR WITH AUTOMATIC REGULATION
Filed Jan. 2, 1952 2 Sheets-Sheet 2
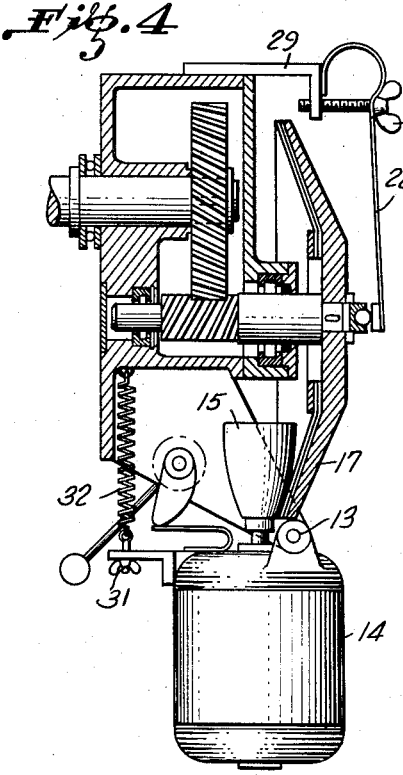
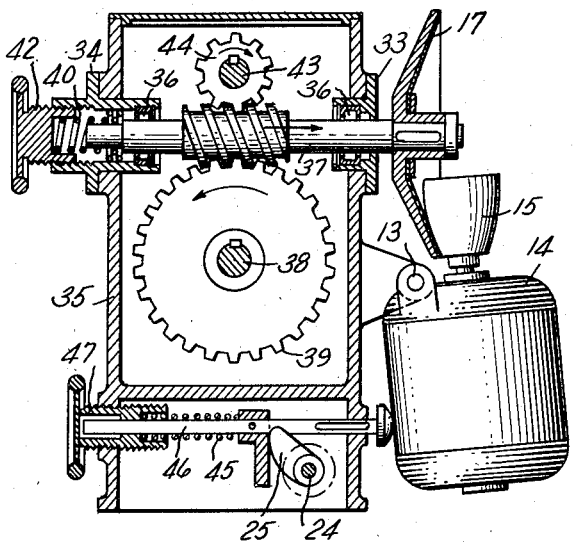
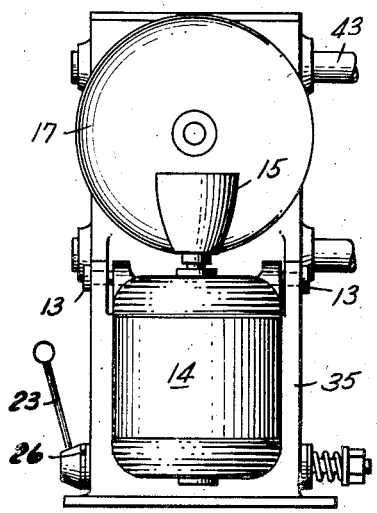
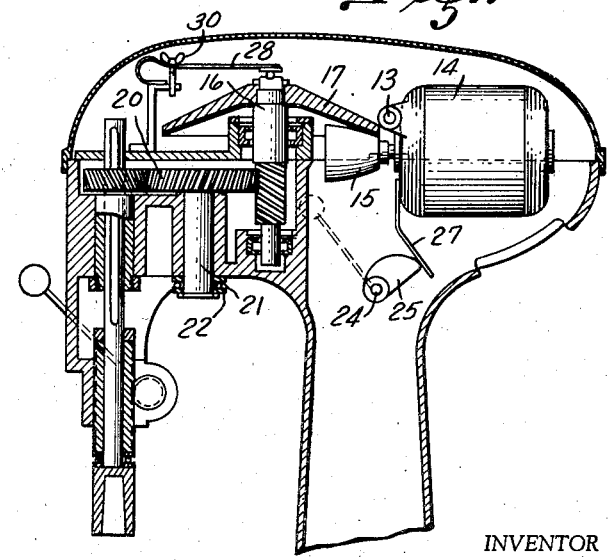
INVENTOR
Willy Puvogel
BY
ATTORNEY

United States Patent Office 2,826,924
Patented Mar. 18, 1958

2,826,924
VARIABLE GEAR WITH AUTOMATIC REGULATION

Willy Puvogel, Bremen, Germany

Application January 2, 1952, Serial No. 264,431

Claims priority, application Germany January 18, 1951

4 Claims. (Cl. 74—190.5)

This invention refers to an infinitely variable gear with right angular or inclined to each other arranged friction bodies, whereat the contact pressure is influenced, dependent upon the load of the gear, by oblique toothed spur gear wheels or by the worm of a worm gear.

The range of application of known gears of this kind is limited on account of the relatively complicated mechanism for shifting the friction bodies against each other. An automatic regulation of the speed of rotation, dependent on the taken up load, can be attained with the known gears only by installing considerable additional appliances, so that also for this reason the great advantage of the automatic regulation of the speed of rotation has to be abandoned.

According to this invention the driven friction disc is fixed to an oblique toothed pinion shaft or on the worm shaft of a worm gear, which is mounted to be rotatable and slidable in its longitudinal direction, geared with the helical gear or the worm gear on the driven shaft, whereby the driven friction disc through the axial pressure, generated by the oblique toothed pinion shaft or the worm shaft, is pressed against a driving friction pulley, which is mounted on a swingable axle or on the shaft of a swingable arranged electric motor. Both friction bodies, of which one at least must have a spherical surface, are constructed conical in their fundamental form for obtaining the possible biggest variability of the speed of rotation within smallest dimensions. The divergence from the theoretically most advantageous form of the friction bodies, resulting herefrom, may be accepted in consideration of the most simple construction of the gear. The driven friction disc will be constructed appropriately bell shaped with conical surface, on which the spherical shaped friction disc, fixed on the axle of the swingable arranged motor, hobs itself in its longitudinal direction, thereby causing the alteration of the speed of rotation.

Besides this, this simple device gives the possibility of regulating automatically the speed of rotation of the driven shaft, dependent on the load of the gear, i. e. the swing momentum of the motor and the contact pressure of the driven friction disc will be used both jointly for the automatic regulation. Bearing on the motor's swivel axis the spherical friction pulley represents during its hobbing motion on the surface of the driven friction disc a lever arm of variable length and the motor represents a lever arm of invariable length with nearly invariable swing momentum. By altering the speed of rotation and the given swing momentum of the motor the contact pressure of the driving friction pulley is accordingly altered, viz.: the contact pressure increases in reducing the speed of rotation and reduces in increasing the speed of rotation of the driven friction disc. In the same sense also the contact pressure is altered by the driven friction disc depending on the twisting moment of the driven shaft and the angle of the oblique toothing. The two contrary to each other working pressures adjust themselves automatically to a fixed point of contact on the driving friction pulley, so, that the speed of rotation of the driven shaft is automatically reduced upon increase of the load on the gear and increased by reduction of the load on the gear, whereas the motor's capacity may be utilised in every case to its full extent. Every characteristic of load and of speed of rotation can be attained by alternating the angle of the toothing and the position of the swing point. If required, the swing momentum of the motor may be influenced by additional weights or springs. This refers especially to a vertically arranged driving motor. It is advisable, when using a light constructed friction disc or a vertically arranged motor, to put also the pinion shaft with the friction disc, under spring pressure. By means of a screw the spring's tension and consequently the characteristic of the gear may be altered.

The object of this invention is shown on the enclosed drawings as follows:

Figure 1: sectional view of a gear with horizontal arranged motor

Figure 2: view of the gear Fig. 1 from above

Figure 3: a sectional view of the contact points between friction pulley and friction disc Figure 4: a gear with friction disc standing under spring pressure Figure 5: a sectional view of a worm gear with vertically arranged motor Figure 6: side view of the gear, Fig. 5

Figure 7: a sectional view of a machine with driving parts installed.

The gear shown in Figures 1 and 2 consists of a gear casing 11 with the prolongations 12, in whose swivel axis 13 the driving motor 14 is suspended pivotally. The friction pulley 15 fixed to the shaft of the driving motor 14 is in contact with the friction disc 17 fixed to the oblique toothed pinion shaft 16. The friction disc 17 is furnished with sound proofing material 18 and is suitably so heavy, that the contact pressure, caused by its weight, will be sufficient, when speeding up begins.

Figure 3 shows the friction pulley 15 hobbing itself in its longitudinal direction on the surface of the friction disc 17, thereby causing the alteration of the speed of rotation.

Roller bearings 19 with casings but without inner rings are installed within the casing 11, bearing the hardened pinion shaft 16, and allow very easy shifting in the longitudinal direction of the shaft 16 and favour a sensitive automatic regulation of the gear during alteration of load. The bearings' diameters are graduated in such a manner, that the pinion shaft 16 with the friction disc 17 can be taken out of casing 11 without difficulties. The cog wheel 20, being engaged with the oblique toothing of the pinion shaft 16, is fixed to the driven shaft 21, which is equipped with a thrust bearing 22 for compensating the axial pressure. A hand regulation device, consisting of a hand lever 23, axle 24, curved piece 25 and brake disc with spring 26, serves the limitation of the speed of rotation of the driven shaft upwards. In case the speed of rotation, compared with the load, is adjusted too high, the speed of rotation is automatically reduced to that point, which is given by the fixed characteristic of the gear. For absorbing the shocks on the hand adjusting device, caused by the varying load of the swing motor 14, a plate spring 27, acting as shock absorber is installed between the motor 14 and the curve piece 25.

The same gear is shown in Figure 4; a light constructed friction disc 17 is installed, whose contact pressure on the friction pulley 15 is reinforced by a plate spring 28. The pressure of the plate spring 28 may be altered by means of the screw 30. The swing momentum of the motor 14 is caused by an adjustable spring 32 regulated by means of the screw 31, in case the gear shall be turned by 90°, i. e. it is driven by horizontal shaft 21 and vertically suspended motor 14.

The principle of the infinitely automatic regulation of the speed according to this invention is especially adapted for driving machines, whereat comparatively small costs are an important question. As in most cases for driving machines a motor and an increasing gear are required, it is possible to construct and arrange in such a manner, that these parts are formed according to this invention. An example for the foregoing, installed as a drilling and milling machine, is shown in Fig. 7, whereat the speed of rotation and the cutting speed adjust themselves automatically to the material's hardness and the cutter's width.

I claim:

1. A variable speed gear with automatic regulation, comprising a driving shaft having a friction disc secured thereon and an oblique toothed pinion, a driven shaft having a gear thereon in mesh with the oblique toothed pinion, a motor pivotally mounted to swing and having a friction pulley in contact with and to drive the friction disc, said pulley having a gradual varying diameter throughout its length, said driving shaft being mounted to slide longitudinally relative to its rotary axis whereby the friction disc is shifted accordingly, and automatic means to urge the motor to rotate on its pivot to vary the surface contact of the pulley on the friction disc to change the speed of the driven shaft relative to the speed of the motor in dependence on the load of the driven shaft.

2. A variable speed gear according to claim 1 in which the friction pulley has a conical surface which contacts the friction disc.

3. A variable speed gear according to claim 1 in which the means include a spring with manual means to vary the tension of the spring.

4. A variable speed gear according to claim 1 in which the means include a spring connected to the motor, and a cam with a manual actuator with the cam contacting the spring to vary the tension therein.

References Cited in the file of this patent

UNITED STATES PATENTS

| | | |
|---|---|---|
| 632,944 | Jansen | Sept. 12, 1899 |
| 1,397,494 | Strong | Nov. 15, 1921 |
| 1,609,439 | Strong | Dec. 7, 1926 |
| 2,168,956 | Kohl | Aug. 8, 1939 |
| 2,253,750 | Beier | Aug. 26, 1941 |
| 2,297,078 | Schlichter | Sept. 29, 1942 |
| 2,570,493 | Schmidt | Oct. 9, 1951 |
| 2,584,541 | Brobeck | Feb. 5, 1952 |

FOREIGN PATENTS

| | | |
|---|---|---|
| 60,907 | Netherlands | Apr. 15, 1948 |